US006976390B2

(12) United States Patent
Albertson

(10) Patent No.: US 6,976,390 B2
(45) Date of Patent: Dec. 20, 2005

(54) ENGINE CYLINDER DEACTIVATION TEST APPARATUS AND METHOD FOR USING

(75) Inventor: William C. Albertson, Clinton Township, MI (US)

(73) Assignee: General Motors Corporation, Detroit, MI (US)

( * ) Notice: Subject to any disclaimer, the term of this patent is extended or adjusted under 35 U.S.C. 154(b) by 77 days.

(21) Appl. No.: 10/808,978

(22) Filed: Mar. 25, 2004

(65) Prior Publication Data

US 2005/0210969 A1 Sep. 29, 2005

(51) Int. Cl.[7] .............................................. G01M 15/00
(52) U.S. Cl. ...................... 73/119 A; 73/116; 123/435
(58) Field of Search ................... 73/116–120; 123/435

(56) References Cited

U.S. PATENT DOCUMENTS 5,188,081 A * 2/1993 Birk et al. .................. 123/479
5,816,220 A * 10/1998 Stumpp et al. ............. 123/435
6,818,841 B1 * 11/2004 McDonald .................... 177/16
2005/0055152 A1 * 3/2005 Wakashiro et al. ......... 701/110

* cited by examiner

Primary Examiner—Eric S. McCall
Assistant Examiner—Jermaine Jenkins
(74) Attorney, Agent, or Firm—Christopher DeVries

(57) ABSTRACT

An apparatus is provided for testing functionality of an engine cylinder deactivation control and system having a plurality of solenoid-operated valves for controlling hydraulic actuation of switching valve lifters. The apparatus includes a portable test box enclosing an electrical circuit connectable to the deactivation control. Also included are a ground lead for connection to the control ground, a solenoid lead for each cylinder and connectable to the solenoids of their respective cylinders, and external taps on the exterior of the box and connected one with each of the ground lead and the solenoid leads. Exemplary methods are disclosed for using the box to test for grounds and circuit resistance as well as proper operation of the system in a running engine.

11 Claims, 3 Drawing Sheets

ENGINE CYLINDER DEACTIVATION TEST APPARATUS AND METHOD FOR USING

TECHNICAL FIELD

This invention relates to electrical test apparatus and, more particularly, to a functionality testing apparatus for an engine cylinder deactivation control and system.

BACKGROUND OF THE INVENTION

It is known in the art relating to internal combustion engines to provide for deactivation of up to half of the engine cylinders in order to improve fuel economy where possible by operating fewer cylinders in a more efficient load range. In some engine arrangements, cylinder deactivation is provided by so-called switching lifters, which are hydraulically actuated to switch from normal actuation of the intake and exhaust valves to a telescoping mode in which the engine valves are deactivated. Simultaneously, fuel injection to the deactivated cylinders is cut off, allowing the pistons to continue reciprocating with a minimum of friction loss while the remaining cylinders drive the engine in a more efficient power mode.

To control hydraulic deactivation of the lifters, as well as shutting off of the injectors, a deactivation control system is provided. This system provides both hydraulic control passages and electrical control apparatus, including solenoid-actuated hydraulic valves, which are electrically operated to control operation of the hydraulic system for actuating the switching lifters. Such features may be packaged in any suitable manner, and may be contained in a lifter oil manifold assembly (LOMA) containing electrical connection terminals, wires and solenoids for operating the solenoid valves.

Individual test procedures have been developed for testing a cylinder deactivation control, or LOMA, prior to installation in an engine and for testing operation of the system after installation in an engine to diagnose operational problems that may be encountered. However, a need has existed for an easy to use multifunction test device that can be applied during engine build, in dynamometer testing, during vehicle development and for vehicle service diagnosis in the field. Such a device will preferably comprise a deactivation multi tester that can be used to perform comprehensive system testing, reveal possible root causes of failures, be simple to use and require no elaborate instrumentation.

SUMMARY OF THE INVENTION

The present invention provides an apparatus for testing functionality of an engine cylinder deactivation control and system having a plurality of solenoid operated valves for controlling hydraulic actuation of switching valve lifters. The apparatus includes a portable test box enclosing an electrical circuit connectable between the deactivation control LOMA wiring harness and the engine wiring harness. Also provided are a ground lead for connection to the control ground, a solenoid lead for each cylinder and connectable to the solenoids of their respective cylinders, and external taps on the exterior of the box and connected one with each of the ground lead and the solenoid leads.

In an exemplary embodiment, a power light, injector cutoff leads and separate cylinder test switches are also included. Exemplary methods are disclosed for using the box to test for grounds and circuit resistance of the system as well as for proper operation of the system in a running engine.

These and other features and advantages of the invention will be more fully understood from the following description of certain specific embodiments of the invention taken together with the accompanying drawings.

DESCRIPTION OF THE PREFERRED EMBODIMENT

Figure 1:
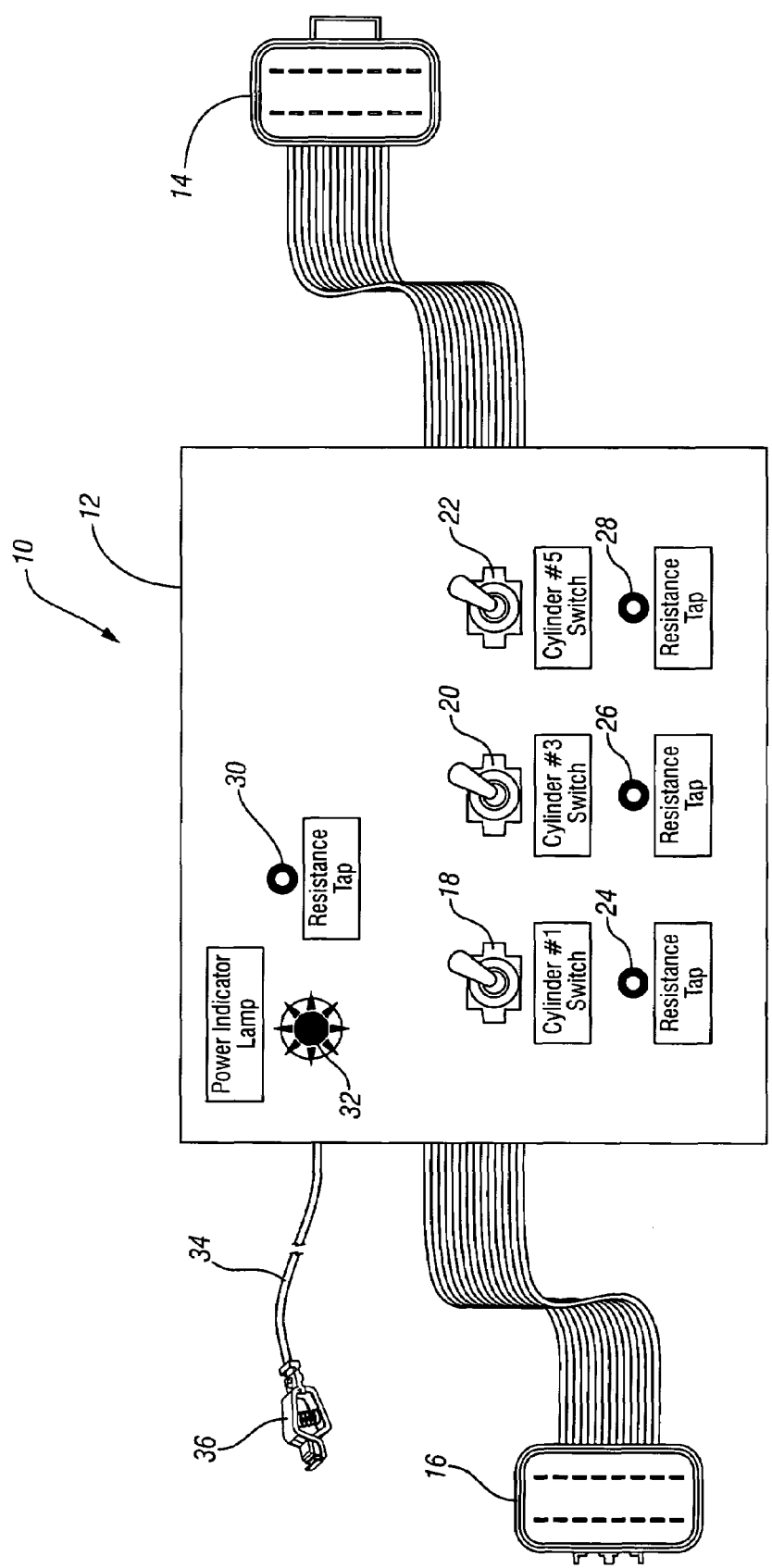
FIG. 1 is an external front view of a LOMA test box for use with six-cylinder engine equipment.

Referring first to FIG. 1 of the drawings, numeral 10 generally indicates test apparatus according to the invention. The apparatus includes a portable test box 12 connected by cables at opposite ends with multiple pin connectors including a first connector 14 to a LOMA/injector harness and a second connector 16 to an engine harness, not shown.

Figure 2:
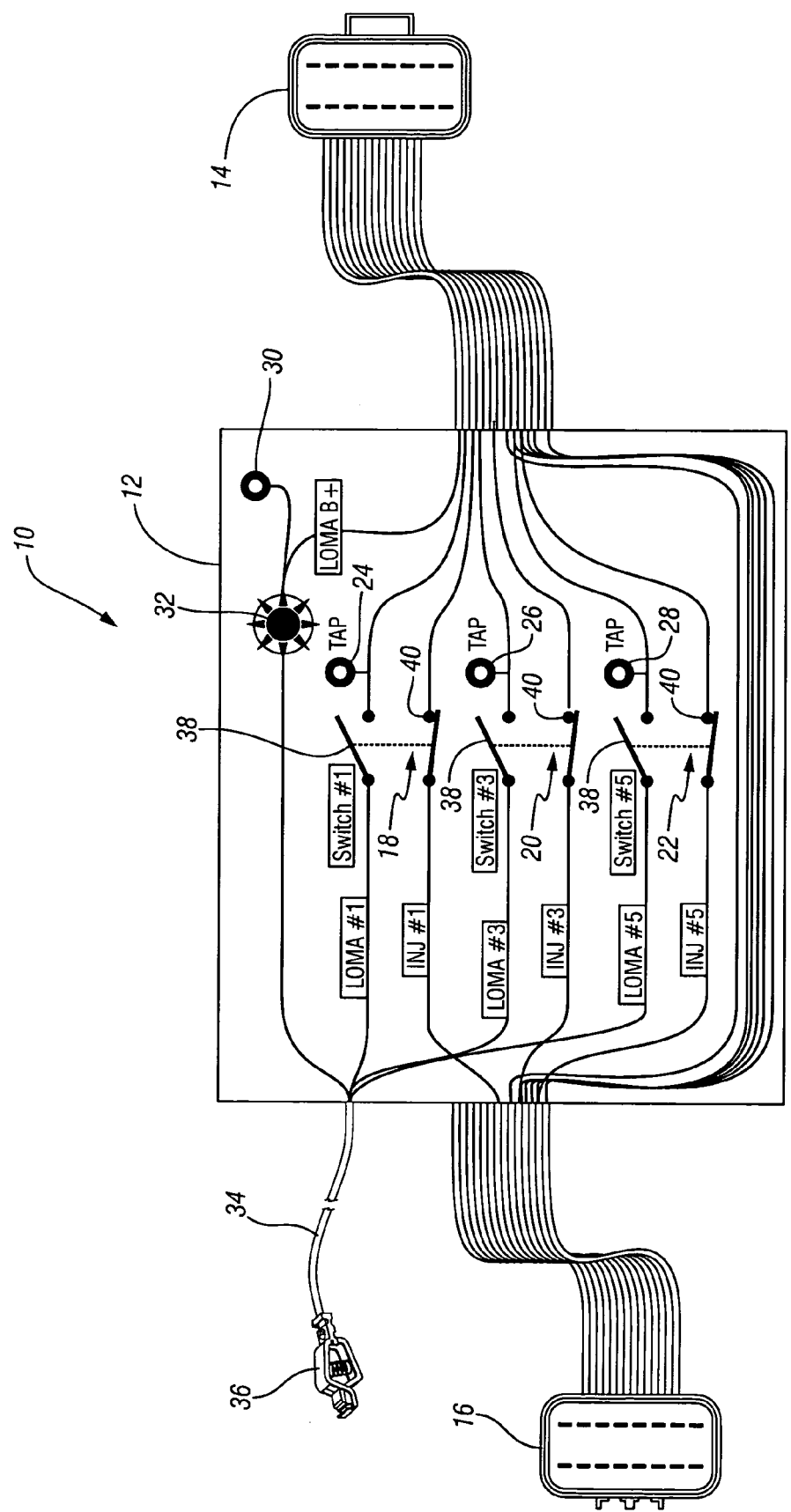
FIG. 2 is a view similar to FIG. 1 but showing the internal circuitry of the test box of FIG. 1.

The front surface of the test box 12 mounts three cylinder switches 18, 20, 22, adapted for association with cylinders 1, 3, and 5, respectively, of an associated engine. Three resistance taps 24, 26, and 28 are associated with the switches 18, 20, 22, respectively. A ground resistance tap 30 is similarly associated with a power lamp 32, visible on the front surface of the test box. A ground wire 34 extends from a side of the box and terminates in an alligator clip 36 for connection to a grounded portion of an engine or other grounded object during certain test procedures, Referring now to FIG. 2, wherein like numerals indicate like components, interior circuitry of the test box 12 is shown schematically, along with previously identified external features.

Each of the switches 18, 20, 22 includes a normally open first pole 38 and a normally closed second pole 40. The first poles 38 of the switches are connected internally to the external ground wire 34. The power lamp 34 is also grounded on one side to the external ground wire 34. On their hot sides, the poles 38 of the switches are connected to their respective resistance taps 24, 26, 28 and, through connector 14, with a source of LOMA electrical power. The hot side of the power lamp 32 similarly connects with its resistance tap 30 and, through connector 14, with the source of LOMA power. The second poles 40 of switches 18, 20, 22 are normally closed to complete ground circuits from injectors, not shown, to the engine injector control unit.

When the test box 12 is connected to an engine electric power circuit, actuation of any of the switches 24, 26, 28 closes its respective pole 38. This completes an electrical circuit through a solenoid valve of an associated LOMA to deactivate the switching lifters of an associated cylinder and deactivate its valves. Simultaneously, the second pole of the actuated switch opens to cut off current floe in the ground side of the injector solenoid of the associated cylinder.

Accordingly, when the test box is connected to an operating engine through the pin connectors 14, 16, actuating any of the switches provides power to deactivate the lifters while simultaneously discontinuing or cutting off fuel supply to the injector of the associated cylinder, so that fuel is not provided to the cylinder when the valves are deactivated. Also, the power lamp 32 is lit and power is provided to the resistance taps 24, 26, 28 and 30.

Use of the deactivation test box requires first that the test box be connected to the LOMA injector harness on the one side and to the engine harness or an alternative source of power on the other side. LOMA solenoid circuit checks can then be made.

Circuit resistance checks for the LOMA valve solenoids, which control pressure oil feed to deactivate the lifters, are conducted by connecting an ordinary ohmmeter between the common resistance tap 30 and each of the individual cylinder switch taps 24, 26 and 28 separately, and measuring the resistance through each of the solenoid circuits individually. A predetermined resistance value range is used to determine if the LOMA solenoid circuits are within acceptable limits.

A separate ground test is made with the ground connecter clip 36 not attached to an engine ground. Instead, an ohmmeter common lead is connected to a good engine ground and the other lead is connected sequentially with each of the other cylinder resistance taps 24, 26, 28 to check for shorts to ground in each of the cylinder solenoid circuits. If any of the circuit checks reveal a malfunction, the resistance values should be recorded and corrective action taken.

To check for electrical power to the LOMA, the multi tester connectors must be connected to the engine harness and the LOMA harness, and the ground clip must be attached to a good engine ground. The engine ignition power should then be turned on which, in a vehicle, would be accomplished by turning on the ignition switch.

With the power on, the power indicator light 32 will light if LOMA power is present. If the power light fails to light, there is no electrical power to the LOMA and the cylinders will not deactivate properly. A check should be made in this case for an open LOMA circuit fuse or a bad power wire connection. If the power light is lit but is very dim, a check should be made for a high resistance path in the LOMA power circuit.

Checks for proper operation of the LOMA in an operating engine are based on the fact that, at light engine loads, if both the intake and exhaust engine valves to a single cylinder are deactivated, the engine speed will increase. This is illustrated in FIG. 3, which graphically charts torque vs. percent throttle opening for a six-cylinder engine with cylinder deactivation.

Figure 3:
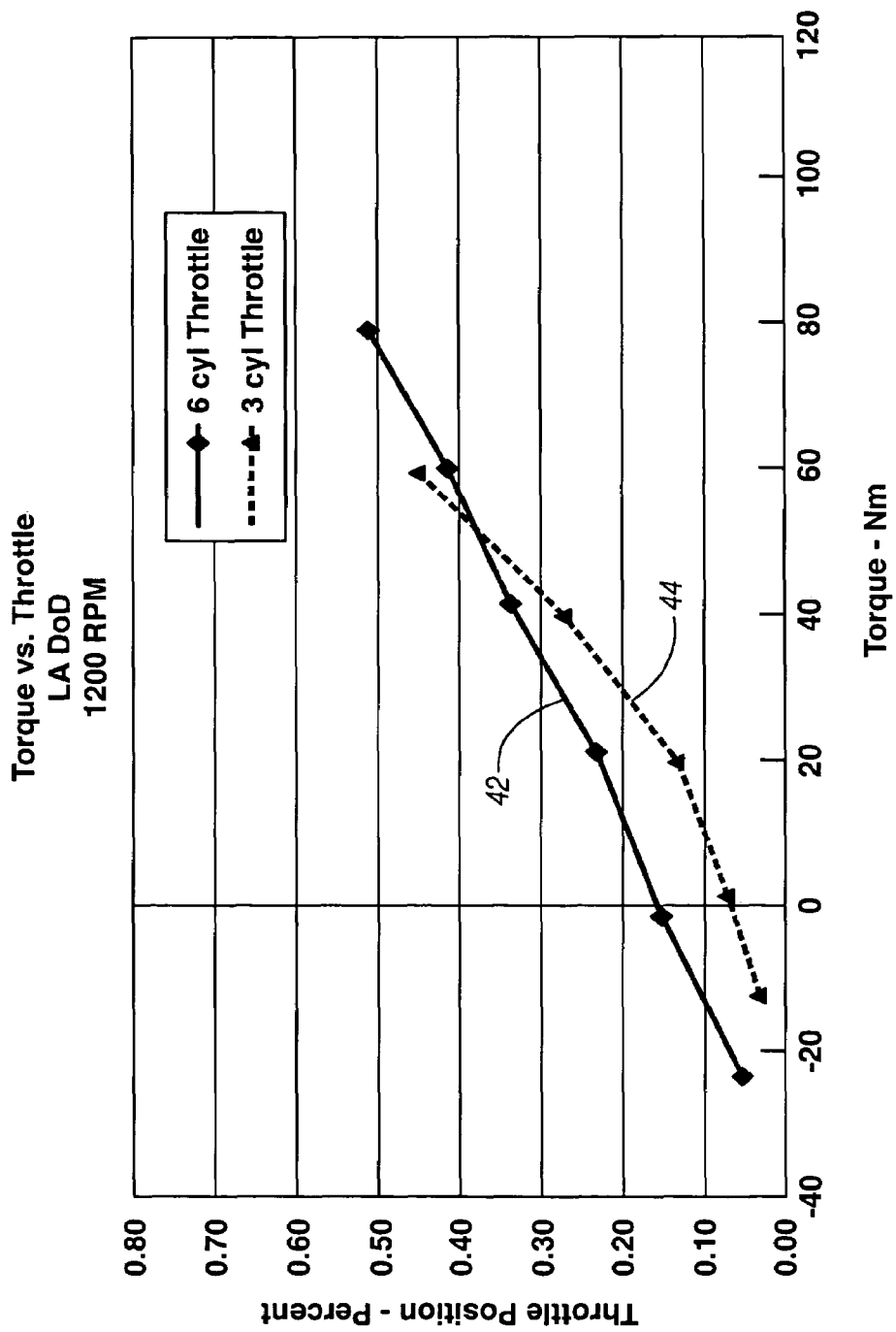
FIG. 3 is a graph of percent throttle position versus torque for the same engine operated on six and three cylinders.

In FIG. 3, line 42 indicates operation of the engine on all six cylinders, while line 44 indicates operation of the engine on only three cylinders, with the other three cylinders deactivated. In each case the engine was run at 1200 RPM and the torque values were determined at various throttle positions. It is noted that below about 50 NM engine torque, there is more torque available in the deactivated mode (cylinders 1, 3 and 5 deactivated) at any given throttle position than there is with all six cylinders operating. Thus, if the cylinders are deactivated and the throttle is held constant, the engine speed should increase.

In view of this fact, a procedure for the dynamic deactivation function test is to run the warmed-up engine at light load and deactivate each cylinder, one at a time, and monitor engine speed. If the deactivation system is operating properly, the deactivation of each cylinder will cause the engine speed to increase. The engine speed increase can normally be easily heard, but if necessary an engine tachometer can be monitored to note the speed changes.

If the engine speed decreases, one or all of the mechanical cylinder deactivation devices, or switching lifters, is not operating. If the speed at first decreases and then increases, one or more of the mechanical cylinder deactivation devices is slow to respond. The multi tester is arranged so that when power is provided to deactivate one of the cylinders, the tester shuts off the fuel injector to that cylinder so that a hydraulic lock does not occur upon reactivation of engine cylinder operation.

Abnormalities in expected engine speed changes can indicate poor hydraulic switching valve operation, low or restricted oil pressure supply to the LOMA, internal LOMA oil leaks, sticky or bound lifter switching pins, or loss of proper switching pin lash.

The specific design or embodiment of deactivation multi tester illustrated is a suggested embodiment of this tool. However, variations of this design, such as including universal connectors for multiple engine applications and integral ohm and speed meters, are possible variations of the design within the spirit and scope of the invention.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A functionality testing apparatus for an engine cylinder deactivation control and system having a plurality of solenoid-operated valves for controlling hydraulic actuation of switching valve lifters, said apparatus comprising:
    a portable test box enclosing an electrical circuit connectable to the deactivation control and having a ground lead for connection to the control ground, a solenoid lead for each cylinder and connectable to the solenoids of their respective cylinders, and external taps on the exterior of the box and connected one with each of the ground lead and the solenoid leads.

2. An apparatus as in claim 1 including a power light in the ground lead operative when grounded to indicate that the deactivation control is supplied with power.

3. An apparatus as in claim 1 including an injector lead for each cylinder and connectable with injector control valves of their respective cylinders.

4. An apparatus as in claim 3 and including a switch in each of the solenoid leads and selectably closable to connect the respective solenoid control leads to a ground line connectable to an external ground.

5. An apparatus as in claim 4 wherein each switch is also connectable in one of the injector leads and is operative to open the associated injector lead upon closing of the switch in the corresponding solenoid lead.

6. An apparatus as in claim 5 including a first harness connector connected with the ground lead, the solenoid leads and the injector leads for connecting these leads with a deactivation control wiring harness.

7. An apparatus as in claim 6 including a second harness connector connected with injector leads for connecting these leads to an engine wiring harness.

8. A method of using an apparatus as in claim 7 for testing functionality of an engine cylinder deactivation control, said method comprising:
    with the cylinder deactivation control installed on an engine, connecting the first and second harness connectors to connectors of the deactivation control wiring harness and the engine wiring harness, respectively, and connecting the ground lead to a good engine ground;
    supplying ignition power to the engine;
    checking whether the power light is lighted with normal brightness, indicating the deactivation control has power without excessive resistance in the power circuit, wherein a dim light indicates a high resistance circuit and failure to light indicates a lack of power supply.

9. A method of using an apparatus as in claim 7 for testing functionality of an engine cylinder deactivation control in an operating engine, said method comprising:

prior to engine operation, connecting the first and second harness connectors to connectors of the deactivation control wiring harness and the engine wiring harness, respectively, and connecting the ground lead to a good engine ground;

operating the engine at constant speed and load conditions in which the torque produced by the engine is greater with at least one of the cylinders deactivated than with all the cylinders activated; and deactivating each of the cylinders separately while maintaining engine speed and load and noting whether engine speed increases to a consistent higher speed with deactivation of each cylinder, wherein lack of a consistent speed increase indicates one or more problems in the operation of the deactivation system of the deactivated cylinder which may be indicated by the resulting engine speed condition.

10. A method of using an apparatus as in claim 1 for testing functionality of an engine cylinder deactivation control, said method comprising:

connecting the test box electrical circuit with an engine cylinder deactivation control;

connecting the terminals of an ohmmeter between the ground lead tap and each of the solenoid lead taps sequentially and reading the resistances through each of the solenoid circuits in the control; and comparing each resistance reading with a predetermined range of values to determine if each solenoid circuit is within the predetermined range.

11. A method as in claim 10 including:

with the ground lead ungrounded, connecting the common terminal of an ohmmeter between an engine ground and each of the solenoid lead taps sequentially and reading the resistance value for each cylinder solenoid circuit; and comparing each resistance reading with the readings for the other circuits or with a predetermined lower limit to determine if corrective action is required.

* * * * *